United States Patent
Mutalikdesai et al.

(10) Patent No.: US 11,240,118 B2
(45) Date of Patent: Feb. 1, 2022

(54) NETWORK MIXING PATTERNS

(71) Applicant: International Business Machines Corporation, Armonk, NY (US)

(72) Inventors: Mandar Mutalikdesai, Bengaluru (IN); Pranjal Srivastava, Bangalore (IN); Sheetal Srivastava, Bengaluru (IN); Ratul Sarkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 16/597,925

(22) Filed: Oct. 10, 2019

(65) Prior Publication Data

US 2021/0111964 A1    Apr. 15, 2021

(51) Int. Cl.
*H04L 12/24* (2006.01)

(52) U.S. Cl.
CPC .................... *H04L 41/14* (2013.01)

(58) Field of Classification Search
CPC ....... H04L 41/14; H04L 41/30; H04L 41/085; H04L 41/0886; H04L 43/00; H04L 12/24; H04L 41/16; H04L 41/145; H04L 41/0806; H04L 41/0893; H04L 41/5096; G06Q 20/4016; G06F 17/21; G06F 16/10; G06F 16/20; G06F 16/906; G06F 16/9536
USPC ........................................................ 709/224
See application file for complete search history.

(56) References Cited

U.S. PATENT DOCUMENTS

| | | | |
|---|---|---|---|
| 6,112,202 A | 8/2000 | Kleinberg | |
| 7,672,833 B2* | 3/2010 | Blume | G06Q 10/10 704/10 |
| 10,241,828 B2* | 3/2019 | Yang | G06F 9/466 |
| 10,375,042 B2* | 8/2019 | Chaum | H04L 9/083 |
| 10,523,682 B1* | 12/2019 | Badawy | H04L 63/1408 |
| 2004/0236866 A1* | 11/2004 | Dugatkin | H04L 41/00 709/235 |
| 2011/0131122 A1* | 6/2011 | Griffin | G06Q 40/08 705/35 |
| 2011/0196791 A1* | 8/2011 | Dominguez | G06Q 20/40 705/44 |
| 2011/0258049 A1* | 10/2011 | Ramer | G06Q 30/02 705/14.66 |

(Continued)

FOREIGN PATENT DOCUMENTS

| | | |
|---|---|---|
| CN | 105933223 A | 9/2016 |
| CN | 106919650 A | 7/2017 |

OTHER PUBLICATIONS

"Assortativity", Wikipedia, edited on Jul. 25, 2019, accessed on Aug. 13, 2019, 5 pages, <https://en.wikipedia.org/wiki/Assortativity>.

(Continued)

*Primary Examiner* — James N Fiorillo (74) *Attorney, Agent, or Firm* — William H. Hartwell; Isaac J. Gooshaw (57) ABSTRACT

A mixing pattern system for networks is provided. One or more nodes in a network are analyzed. Grouping the one or more nodes into one or more classes within the network. A computer device analyzes one or more transactions between the one or more nodes in the network that include nodes within similar or distinct classes of the one or more nodes. A computer device identifies one or more mixing patterns associated with one or more transactions between the one or more nodes.

20 Claims, 6 Drawing Sheets

(56) References Cited

U.S. PATENT DOCUMENTS

| | | | |
|---|---|---|---|
| 2012/0101925 A1 | 4/2012 | Leibon et al. | |
| 2012/0303425 A1* | 11/2012 | Katzin | G06Q 20/12 705/14.4 |
| 2013/0117278 A1* | 5/2013 | Martens | G06Q 20/384 707/748 |
| 2014/0289867 A1* | 9/2014 | Bukai | G06Q 20/4016 726/28 |
| 2015/0058993 A1* | 2/2015 | Choi | G06N 7/005 726/25 |
| 2016/0196572 A1 | 7/2016 | Yoder et al. | |
| 2016/0232056 A1* | 8/2016 | Grube | H04L 67/1097 |
| 2017/0004506 A1* | 1/2017 | Steinman | G06Q 20/4016 |
| 2017/0132636 A1 | 5/2017 | Caldera | |
| 2017/0255938 A1* | 9/2017 | Biegun | G16Y 20/40 |
| 2018/0068395 A1 | 3/2018 | Gupta et al. | |
| 2018/0176086 A1* | 6/2018 | Thwaites | H04L 41/30 |
| 2019/0164164 A1* | 5/2019 | Karambakkam | G06K 9/6218 |
| 2019/0340013 A1* | 11/2019 | Cella | G06F 9/5005 |
| 2019/0378049 A1* | 12/2019 | Widmann | G06N 3/0472 |
| 2020/0065292 A1* | 2/2020 | Li | H04L 63/1425 |
| 2020/0104337 A1* | 4/2020 | Kelly | G06F 16/906 |
| 2020/0169483 A1* | 5/2020 | Kursun | H04L 67/2833 |
| 2020/0272959 A1* | 8/2020 | Mattsson | G06Q 20/023 |
| 2020/0311728 A1* | 10/2020 | Jain | G06Q 20/4016 |
| 2020/0394659 A1* | 12/2020 | Qu | G06Q 20/4016 |
| 2021/0064982 A1* | 3/2021 | Trim | G06N 3/0454 |

OTHER PUBLICATIONS

"Measures of 'Partyness' and 'Counter-partyness' for financial transaction networks", IP.com Prior Art Database Technical Disclosure, IP.com No. IPCOM000257245D, Electronic Publication Date: Jan. 24, 2019, 4 pages.

"Mixing patterns", Wikipedia, edited on Nov. 14, 2018, accessed on Aug. 13, 2019, 5 pages, <https://en.wikipedia.org/wiki/Mixing_patterns>.

* cited by examiner

NETWORK MIXING PATTERNS

BACKGROUND OF THE INVENTION

The present invention relates generally to the field of network transaction, and more particularly to mixing patterns.

The proliferation of online-based network transactions has enriched the ability for users to detect and measure the preference for a network's nodes to transact with various other nodes in a similar and subsequent pattern. By utilizing mixing patterns, a user is able to provide a layout of a node's preference or subsequent likelihood to transact with various other nodes.

SUMMARY

Embodiments of the present invention provide a method, system, and program product to analyze and detect the mixing patterns of a network node.

A first embodiment encompasses a method for managing a mixing pattern system of a network of nodes. One or more processors analyze one or more nodes in a network. The one or more processors group the one or more nodes into one or more classes within the network. The one or more nodes analyze one or more transactions between the one or more nodes in the network that include nodes within similar or distinct classes of the one or more nodes. The one or more processors identify one or more mixing patterns associated with one or more transactions between the one or more nodes.

A second embodiment encompasses a computer program product for managing a mixing pattern system of a network of nodes. The computer program product includes one or more computer-readable storage media and program instructions stored on the one or more computer-readable storage media. The program instructions include program instructions to analyze one or more nodes in a network. The program instructions include program instructions to group the one or more nodes into one or more classes within the network. The program instructions include program instructions to analyze one or more transactions between the one or more nodes in the network that include nodes within similar or distinct classes of the one or more nodes. The program instructions include program instructions to identify one or more mixing patterns associated with one or more transactions between the one or more nodes.

A third embodiment encompasses a computer system for managing a mixing pattern system of a network of nodes. The computer system includes one or more computer processors, one or more computer-readable storage medium, and program instructions stored on the computer readable storage medium for execution by at least one of the one or more processors. The computer program includes one or more computer-readable storage media and program instructions stored on the one or more computer-readable storage media. The program instructions include program instructions to analyze one or more nodes in a network. The program instructions include program instructions to group the one or more nodes into one or more classes within the network. The program instructions include program instructions to analyze one or more transactions between the one or more nodes in the network that include nodes within similar or distinct classes of the one or more nodes. The program instructions include program instructions to identify one or more mixing patterns associated with one or more transactions between the one or more nodes.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to detecting party-mixing are known, these solutions may be inadequate to correctly identify fraudulent transactions and subsequently preventing these fraudulent transactions. Embodiments of the present invention recognizes that such solutions can be improved by proactively analyzing transactions and metadata from various parties of one or more institutions and identifying the occurrence and direction of the various transactions that occur between the parties.

Embodiments of the present invention provide for a more effective and sustainable approach to party-mixing by analyzing the various transactions that occur between the parties and the frequency and direction that these transactions occur.

Furthermore, the present invention provides an effective system for producing a hierarchy of measures describing the nature of the transactions between the various parties associated with one or more institutions.

In one embodiment of the present invention, mixer analyzation program 122 analyzes one or more nodes in a network. Mixer analyzation program 122 groups the one or modes into one or more classes within the network. Mixer analyzation program 122 analyzes one or more transactions between the one or more nodes in the network that include nodes within similar or distinct classes of the one or more nodes. Mixer analyzation program 122 identifies one or more mixing patterns associated with one or more transactions between the one or more nodes.

In one embodiment of the present invention, mixer analyzation program 122 retrieves one or more mixing data associated, at least, with the one or more nodes, wherein the one or more mixing data includes one or more attributes associated with the one or more nodes. Mixer analyzation program 122 analyzes one or more transactions associated with, at least, one node between two or more nodes. Mixer analyzation program 122 identifies one or more transactions associated with, at least, one node, wherein the, at least, one node receives one or more transactions from one or more nodes. Mixer analyzation program 122 identifies one or more transactions associated with, at least, one node, wherein the, at least, one node communicates one or more transactions to one or more nodes.

In one embodiment of the present invention, mixer analyzation program 122 generates a classification associated with the one or more nodes, wherein the classification represents one or more transactions between, at least, one node and one or more other nodes. Mixer analyzation program 122 analyzes the classification associated with the one or more nodes. Mixer analyzation program 122 determines one or more mixing patterns associated with tone or more transactions between the one or more nodes.

In one embodiment of the present invention, mixer analyzation program 122 identifies one or more parameters that is, at least, associated with the one or more mixing patterns associated with the one or more transactions between the one or more nodes. Mixer analyzation program 122 identifies one or more mixing patterns associated with the one or more transactions between the one or more nodes. Mixer analyzation program 122 stores (i) the classification, (ii) the one or more mixing patterns, and (iii) the one or more parameters.

In one embodiment of the present invention, mixer analyzation program 122 generates a classification associated with the one or more nodes, wherein the classification represents one or more transactions between, at least, one node and one or more other nodes. Mixer analyzation program 122 analyzes the classification associated with the one or more nodes. Mixer analyzation program 122 determines one or more mixing patterns associated with one or more transactions between the one or more nodes.

In one embodiment of the present invention, mixer analyzation program 122 identifies one or more mixing patterns associated with the one or more transactions between the one or more nodes that is based on one of: (i) assortative mixing between the one or more nodes and various nodes in similar or distinct classes of the one or more nodes; (ii) disassortative mixing between the one or more nodes and various nodes in similar or distinct classes of the one or more nodes; (iii) counter-assortative mixing between the one or more nodes and various nodes in similar or distinct classes of the one or more nodes; or (iv) counter-disassortative mixing between the one or more nodes and various nodes in similar or distinct classes of the one or more nodes.

The present invention will now be described in detail with reference to the Figures.

Figure 1:
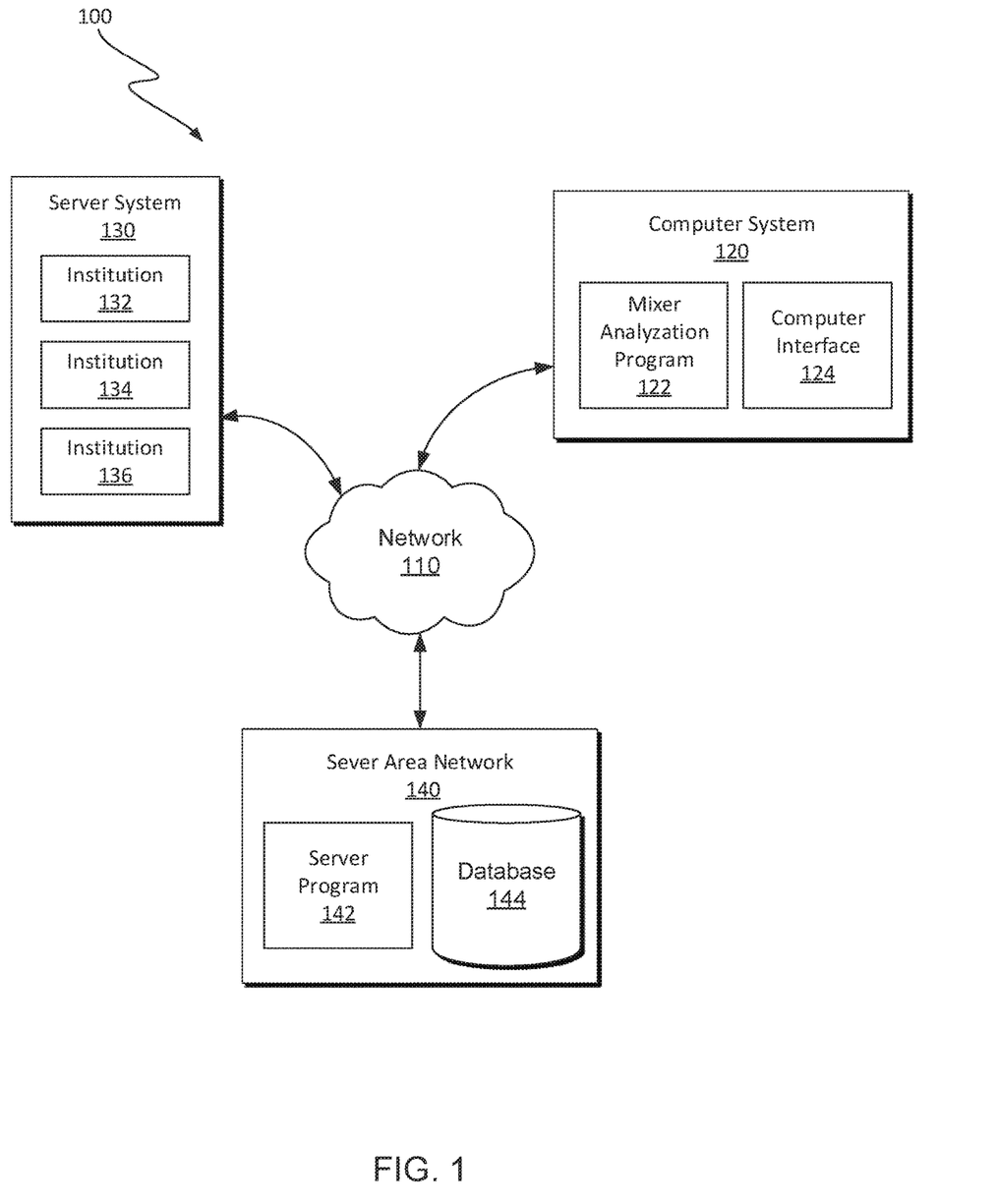
FIG. 1 is a functional block diagram illustrating a computing environment, in which a mixing pattern analysis is executed, in accordance with an exemplary embodiment of the present invention.

FIG. 1 is a functional block diagram illustrating a computing environment, generally designated 100, in accordance with on embodiment of the present invention. Computing environment 100 includes computer system 120, server system 130, and server area network 140 connected over network 110. Computer system 120 includes mixer analyzation program 122 and computer interface 124. Server system 130 includes institution 132, institution 134, and institution 136, generally referred to hereinafter as "institutions 132-136." Server area network (SAN) 140 includes server program 142 and database 144.

In various embodiments of the present invention, computer system 120 is a computing device that can be a standalone device, a server, a laptop computer, a tablet computer, a netbook computer, a personal computer (PC), a personal digital assistant (PDA), smartwatch, a desktop computer or any programmable electronic device capable of receiving, sending, and processing data. In general, computer system 120 represents any programmable electronic device or combination of programmable electronic devices capable of executing machine readable program instructions and communication with server system 130 and SAN 140. In another embodiment, computer system 120 represents a computing system utilizing clustered computers and components to act as a single pool of seamless resources. In general, computer system 120 can be any computing device or a combination of devices with access to server system 130, SAN 140, and network 110 and is capable of executing mixer analyzation program 122 and computer interface 124. Computer system 120 may include internal and external hardware components as depicted and described in further detail with respect to FIG. 1.

In this exemplary embodiment, mixer analyzation program 122 and computer interface 124 are stored on computer system 120. However, in other embodiments, mixer analyzation program 122 and computer interface 124 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, server system 130, and SAN 140, in accordance with a desired embodiment of the present invention.

Computer system 120 includes computer interface 124. Computer interface 124 provides an interface between computer system 120, server system 130, and SAN 140. In some embodiments, computer interface 124 can be a graphical user interface (GUI) or a web user interface (WUI) and can display text, documents, web browser, windows, user options, applications interfaces, and instructions for operation, and includes the information (such as graphic, text, and sound) that a program presents to a user and the control sequences the user employs to control the program. In some embodiments, computer system 120 accesses data communicated from server system 130 and/or SAN 140 via a client-based application that runs on computer system 120. For example, computer system 120 includes mobile application software that provides an interface between computer system 120, server system 130, and SAN 140.

In various embodiment of the present invention, server system 130 is a storage system that includes, but is not limited to, institution 132, institution 134, and institution 136. Server system 130 is depicted in FIG. 1 for illustrative simplicity, the present invention recognizes that server system 130 can include any number of institutions or various other databases. Server system 130 may include one or more of, but is not limited to, computing devices, servers, server-clusters, web servers, databases and storage devices. Server system 130 operates to communicate with computer system 120, SAN 130, and any other various computing devices over a network, such as network 110. For example, server system 130 communicates with mixer analyzation program 122 to transfer data between, but is not limited to, institutions 132-136 and various other institutions (not shown) that are connected to network 110. In general, server system 130 can be any computing device or a combination of devices that are communicatively connected to a local IoT network, i.e., a network comprised of various computing devices including, but are not limited to, computer system 120 and SAN 140, to provide the functionality described herein. Server system 130 can include internal and external hardware components as described with respect to FIG. 6. The present invention recognizes that FIG. 1 may include any number of computing devices, servers, databases and/or storage devices, and the present invention is not limited to only what is depicted in FIG. 1. As such, in some embodiments, some or all of the features and functions of server system 130 are included as part of computer system 120 and/or another computing device. Similarly, in some embodiments, some of the features and functions of computer system 120 are included as part of server system 130 and/or or another computing device.

Additionally, in some embodiments, server system 130 represents a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model; and can be implemented as various deployment models including as a private cloud, a community cloud, a public cloud, and a hybrid cloud.

In various embodiments, server system 130 represents a local IoT network. In the embodiment depicted in FIG. 1, institutions 132-136 are respectively stored on and executed by server system 130. The present invention recognizes that server system 130 can include any number of institutions that are respectively stored on and executed by server system 130. In another embodiment, server system 130 can store and/or execute a different count of applications without departing from the scope of the present invention. In general, server system 130 operates to transmit respective party-mixing data to SAN 140 and/or computer system 120, as described herein. Additionally, server system 130 operate to notify, via network 110, computer system 120 and various other computing devices (not shown) of conditions and/or respective transaction that may occur within server system 130. In one embodiment and example, server system 130 includes a well-being monitoring application that utilizes elements of server system 130 to monitor party-mixing data transmitted from server system 130 to computer system 120, SAN 140, and/or various other computing devices (not shown) regarding the status of transactions between various institutions. This example will be referenced in various embodiments herein to illustrate various aspects of the present inventions, but the present invention is not to be construed as being limited to such embodiments. In some embodiments, IoT applications executing on server system 130 can also include analytics logic to analyze data from one or more institutions to facilitate vector quantization rules and other logical operations utilized by the institutions, as described herein.

Institutions 132-136 are depicted in FIG. 1 for illustrative simplicity, server system 130, however, can include any number of logics that are managed in accordance with institutions 132-136. In general, institutions 132-136 represents a physical or virtual resource to which the entity, organization, or one or more individuals represented by each institution (e.g., institution 132, institution 134, institution 136, etc.), respectively, communicates data to SAN 140 and/or computer system 120. In some embodiments, institutions 132-136 represents information and server system 130 manages the ability to communicate the information. In another embodiment, institutions 132-136 represents control over a physical or virtual resource and server system 130 manages the ability to use and modify the resource. In an alternative embodiment, mixer analyzation program 122 can also represent any combination of the aforementioned elements, and has the ability to manage, use, and modify the resource. To illustrate various aspects of the present invention, examples of server system 130 and institutions 132-136 are presented in which institutions 132-136 represents one or more of: commercial transaction, a financial transaction, user profile transaction, trade surveillance, trade order life-cycles, party relationships, due diligence information of structured and/or unstructured sources, are presented, but embodiments of institutions 132-136 are not limited thereto. Embodiments of the present invention recognize that institutions 132-136 may include other forms of contract events that are known in the art.

In the embodiment depicted in FIG. 1, mixer analyzation program 122 utilizes, at least in part, data stored on server system 130 and SAN 140 in response to a mixer-analyzation request from computer system 120 (i.e., from the user of computer system 120, alternatively referred to herein as a "requestor"). More specifically, mixer analyzation program 122 defines a homophily hierarchy that represents various transactions that are associated with, at least, one of: (i) assortativity, (ii) disassortativity, (iii) counter-assortative mixing, and (iv) counter-disassortative mixing that are classified based, at least in part, on the partyness and/or counter-partyness of the parties to various contract events.

In various embodiments, assortativity represents a preference of, at least, one node (i.e., node A) to connect with one or more other nodes that belong to the class of node A. In various embodiments, disassortativity, represents a preference of, at least one node (i.e., node A) to connect to one or more other nodes that belong to a class disassociated with, at least, the one node (i.e., node A). In various embodiments, counter-assortativity represents the mixing tendency for, at least, one node (i.e., node A) to receive transactions from one or more other nodes that belong to a class associated with, at least, the one node (i.e., node A). In various embodiments, counter-disassortativity represents the mixing tendency for, at least, one node (i.e., node A) to receive transactions from one or more other nodes that belong to a class disassociated with, at least, the one node (i.e., node A).

Storage area network (SAN) 140 is a storage system that includes server program 142 and database 144. SAN 140 may include one or more, but is not limited to, computing devices, servers, server-cluster, web servers, database and storage devices. SAN 140 operates to communicate with computer system 120, server system 130, and various other computing devices (not shown) over a network, such as network 110. For example, SAN 140 communicates with mixer analyzation program 122 to transfer data between, but is not limited to, computer system 120, server system 130, and various other computing devices (not shown) that are connected to network 110. SAN 140 can be any computing device or a combination of devices that are communicatively connected to a local IoT network, i.e., a network comprised of various computing devices including, but are not limited to computer system 120 and server system 130 to provide the functionality described herein. SAN 140 can include internal and external hardware components as described with respect to FIG. 6. The present invention recognizes that FIG. 1 may include any number of computing devices, servers, databases and/or storage devices, and the present invention is not limited to only what is depicted in FIG. 1. As such, in some embodiments, some or all of the features and functions of San 140 are included as apart of computer system 120, server system 130, and/or another computing device. Similarly, in some embodiments, some of the features and functions of computing system 120 are included as a part of SAN 140 and/or another computing device.

Additionally, in some embodiments, SAN 140 represents a cloud computing platform Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model; and can be implemented as various deployment models including as a private cloud, a community cloud, a public cloud, and a hybrid cloud.

In various embodiments, SAN 140 is depicted in FIG. 1 for illustrative simplicity. However, it is to be understood that, in various embodiments, SAN 140 can include any number of databases that are managed in accordance with the functionality of server program 142. In general, database 144 represents data and server program 142 represents code that provides an ability to take specific action with respect to another physical or virtual resource and manages the ability to use and modify the data. In an alternative embodiment, mixer analyzation program 122 can also represent any combination of the aforementioned features, in which server program 142 has access to database 144. To illustrate various aspects of the present invention, examples of server program 142 are presented in which mixer analyzation program 122 represents one or more of, but is not limited to, a local IoT network and contract event monitoring system.

In this exemplary embodiment, server program 142 and database 144 are stored on SAN 140. However, in other embodiments, server program 142 and database 144 may be stored externally and accessed through a communication network, such as network 110, as discussed above.

In the embodiment depicted in FIG. 1, server program 142, at least in part, has access to mixer analyzation program 122 and can communicate party-mixing data stored on SAN 140 and/or server system 130 to computer system 120. Alternatively, mixer analyzation program 122 has access to server program 142 and can communicate party-mixing data stored on computer system 120, SAN 140, and server system 130. In some embodiments, computer system 120 and SAN 140 have access to various other computing devices (not shown) and can communicate data stored, respectively on computer system 120, server system 130, and SAN 140 to the various other computing devices. For example, mixer analyzation program 122 defines a network monitoring system for computer system 120 that has access to party-mixing data on server system 130 and/or database 144 and has access to party-mixing data on other computer systems (e.g., various other computing devices).

In various embodiments depicted in FIG. 1 party-mixing data is, at least in part, obtained from server system 130. Server system 130 includes, but is not limited to, institutions 132-136, as discussed above. Institutions 132-136 includes, but is not limited to, one or more parties. Parties represents entities, organization, and/or individuals, etc., and the transactions (i.e., party-mixing data) that can occur within these institutions. Party-mixing data is associated with, at least, institutions 132-136 and the transactions that occur within each institution and/or from one institution to, at least, a second institution, respectively. Party-mixing data includes, but is not limited to, transactions and/or relationships from one party to a second party. In one embodiment and example of the present invention, party-mixing data is associated, at least in part, with the tendency in which one party transacts with, at least, a second party within its own class, respectively, and is known as assortativity or assortative mixing. In one embodiment and example of the present invention, party-mixing data is associated, at least in part, with the tendency in which one party transacts with, at least, a second party outside of its own class, respectively, and is known as disassortativity or disassortative mixing.

In various embodiments depicted in FIG. 1, party-mixing data originates within server system 130. The present invention recognizes that party-mixing data is associated, at least, with transaction that occur between one or more parties within the one or more institutions of server system 130. In some embodiments, server program 142 communicates with server system 130 and requests the party-mixing data be transmitted to SAN 140, wherein server program 142 stores the data on database 144 for subsequent use. In an alternative embodiment, mixer analyzation program 122 communicates a set of program instructions to server program 142 instructing server program 142 to communicate with server system 130 and requests server system 130 to transmit party-mixing data to SAN 140. In yet another embodiment, mixer analyzation program 122 communicates with server system 130 and retrieves party-mixing data from server system 130.

In various embodiments of the present invention, the institutions of server system 130 (i.e., institutions 132-136) include, but are not limited to, one or more nodes (e.g., parties) wherein each node, respectively are grouped together with similar nodes into a class. Within each institution within server system 130 include, but are not limited to, one or more classes, respectively. The one or more classes within each institution within server system 130 are measured, at least, on the partyness and counter-partyness of each class with respect to the surrounding one or more classes.

In various embodiments of the present invention, partyness represents the mixing tendency of, at least, one node (i.e., node A) to be the originator (i.e., the source) of one or more transactions in a transactional network. In various embodiments of the present invention, counter-partyness represents the mixing tendency of, at least, one node (i.e., node A) to be the recipient (i.e., receive from the originator) one or more transactions in a transactional network.

In various embodiment of the present invention, the one or more nodes contained within the one or more institutions of server system 130 interact with one another, respectively, based, at least in part, on the transactions and/or relationships generated by the parties. Each node contains one or more attributes that include but are not limited to, account creation date, account type, account number, the identity of the organization, organization function, owner of the account, age of owner, etc.

In various embodiments, a user of computer system 120 generates a homophily request based, at least in part, to view party-mixing data of transactions between different parties. In some embodiments, a user of computer system 120 selects the parameters and categories that mixer analyzation program 122 utilizes to analyze and identify various party-mixing between the parties.

In various embodiments of the present invention, mixer analyzation program 122 requests party-mixing data from SAN 140 and/or server system 130 in response to a homophily request from computer system 120 (i.e., from a user of computer system 120, alternatively referred to herein as "requestor"). In various embodiments, one or more users utilize computer system 120 to access and generate a homophily request associated with the party-mixing data of server system 130. The users of computer system 120 may be one of, but are not limited to, (i) one or more analysts, (ii) one or more investigators, or (iii) one or more regulators. The users of computer system 120 generate a homophily request by selecting a combination of "n" parameters based, at least in part, on the classification of the nodes (e.g. parties), additionally the users select number of "k" categories that are associated with each parameter, respectively. Mixer analyzation program 122 generates a homophily request based, at least in part, on the selection of "n" properties and "k" categories by the user of computer system 120. The number of categories and parameters can be represented by where i=1, 2, . . . n.

In various embodiments, mixer analyzation program 122 based, at least in part, on the homophily request generated by the user of computer system 120, communicates the homophily request to server program 142. Additionally, mixer analyzation program 122 requests party-mixing data from server program 142 that, at least in part, is associated with the data contained within the homophily request from server program 142. In some embodiments, mixer analyzation program 122 communicates with server program 142 and requests the party-mixing data. In some embodiments, mixer analyzation program 122 communicates a set of program instructions to server program 142 instructing server program 142 to communicate party-mixing data to mixer analyzation program 122 periodically. One having ordinary skill in the art would understand that periodically represent time periods and includes, but is not limited to, defined time periods (e.g., 12 pm, 2 pm, etc.) and undefined time periods (e.g., every 2 hours, every 4 hours, etc.).

The present invention recognizes that in various embodiments depicted in FIG. 1, server program 142 communicates with server system 130 and requests party-mixing data. Server program 142 communicates a set of program instructions to server system 130 instructing server system 130 to retrieve one or more party-mixing data from the one or more institutions (e.g., institutions 132-136) and transmit the one or more party-mixing data to server program 142.

In various embodiments of the present invention, mixer analyzation program 122 receives party-mixing data from SAN 140. In some embodiments, mixer analyzation program 122 receives party-mixing data from server system 130. Mixer analyzation program 122 analyzes the party-mixing data and identifies various attributes regarding the one or more nodes (i.e., parties) of the one or more accounts, respectively. In various embodiments, mixer analyzation program 122 identifies one or more attributes that include but are not limited to, account creation date, account type, account number, the identity of the organization, organization function, owner of the account, age of owner, etc., of the one or more nodes, respectively. Mixer analyzation program 122 stores this data on database 144.

In various embodiments, mixer analyzation program 122 analyzes one or more nodes based, at least in part, on either the (i) partyness or (ii) counter-partyness of the various classes of the one or more nodes. In some embodiments, based, at least, on the homophily request generated by the user of computer system 120, the homophily request defines one or more classes for the one or more nodes. Mixer analyzation program 122 analyzes the homophily request and further analyzes the party-mixing data and identifies the one or more nodes and the one or more classes. In some embodiments, mixer analyzation program 122 classifies the one or more nodes into one or more classes and generates a homophily hierarchy. The present invention recognizes that the homophily hierarchy is an organizational illustration highlighting the various transactions between parties that creates various party-mixing data. More specifically, the homophily hierarchy represents data that illustrates the partyness and/or counter-partyness between one or more parties, as well as, at least, one of the following that describes the relationship between the one or more parties: (i) assortativity, (ii) disassortativity, (iii) counter-assortative mixing, and (iv) counter-disassortative mixing. In some scenarios and embodiments, the homophily request contains one or more parameters to classify the one or more nodes. In some scenarios and embodiments, these parameters represent various measures based, at least, on a threshold level. The measures of the parameters include, but are not limited to, (i) partyness and (ii) partyness and are further measured based, at least, on one or more threshold levels that include, but are not limited to, (i) low, (ii) medium, or (iii) high. Based, at least, on the homophily request, the various parameters and threshold levels include but are not limited to, (i) one or more nodes that have low partyness and low counter-partyness, (ii) one or more nodes that have low partyness and high counter-partyness, (iii) one or more nodes that have high partyness and low counter-partyness, and (iv) one or more nodes that have high partyness and high counter-partyness. In various embodiments, the homophily request can contain any number of threshold levels defined to classify the one or more nodes.

In various embodiments of the present invention, based, at least, on the classification of the one or more nodes by mixer analyzation program 122, mixer analyzation program 122 analyzes the homophily hierarchy and identifies the mixing patterns of the one or more nodes contained within the one or more classes of the homophily hierarchy. In various embodiments and examples, mixer analyzation program 122 identifies the mixing patterns of each node as one of: (i) assortativity, (ii) disassortativity, (iii) counter-assortativity, and (iv) counter-disassortativity, respectively.

In various embodiments of the present invention, the mixing patterns, as discuss above, can be, but is not limited to, illustrated as follows. In some embodiments of the present invention, assortativity is defined as assortativity (x)=(number of transactions from x to nodes of the same class that x belongs to)/(total number of transactions from node x), wherein "x" is associated, at least, with one node from the homophily hierarchy. In some embodiments of the present invention, disassortativity is defined as disassortativity (x)_C1=(number of transactions from x to nodes of one or more classes that x does not belong to)/(Total number of transactions from node x), wherein "x" is associated, at least, with one node from the homophily hierarchy. In some embodiments of the present invention, counter-assortativity (x)=(number of incoming transactions to x from nodes of the same class that x belongs to)/(total number of incoming transactions to node x), wherein "x" is associated, at least, with one node from the homophily hierarchy. In some embodiments of the present invention, counter-disassortativity is defined as counter-disassortativity (x)_C1=(number of transactions to x from nodes of one or more nodes of classes other than the class that node x belongs to)/(total number of incoming transactions to x), wherein "x" is associated, at least, with one node from the homophily hierarchy.

In various embodiments of the present invention, mixer analyzation program 122 analyzes the generated homophily hierarchy and identifies the one or more classes that include one or more nodes. Mixer analyzation program 122 further analyzes the nodes within the homophily hierarchy and identifies the mixing patterns of the one or more nodes. Mixer analyzation program 122 generates a mixing-pattern label and assigns each node a mixing-pattern label, respectively, based on the identification of the mixing pattern (i.e., assortativity, disassortativity, counter-assortativity, counter-disassortativity). Mixer analyzation program 122 populates computer interface 124 with the homophily hierarchy and the mixing-pattern labels for each node, respectively.

Figure 2:
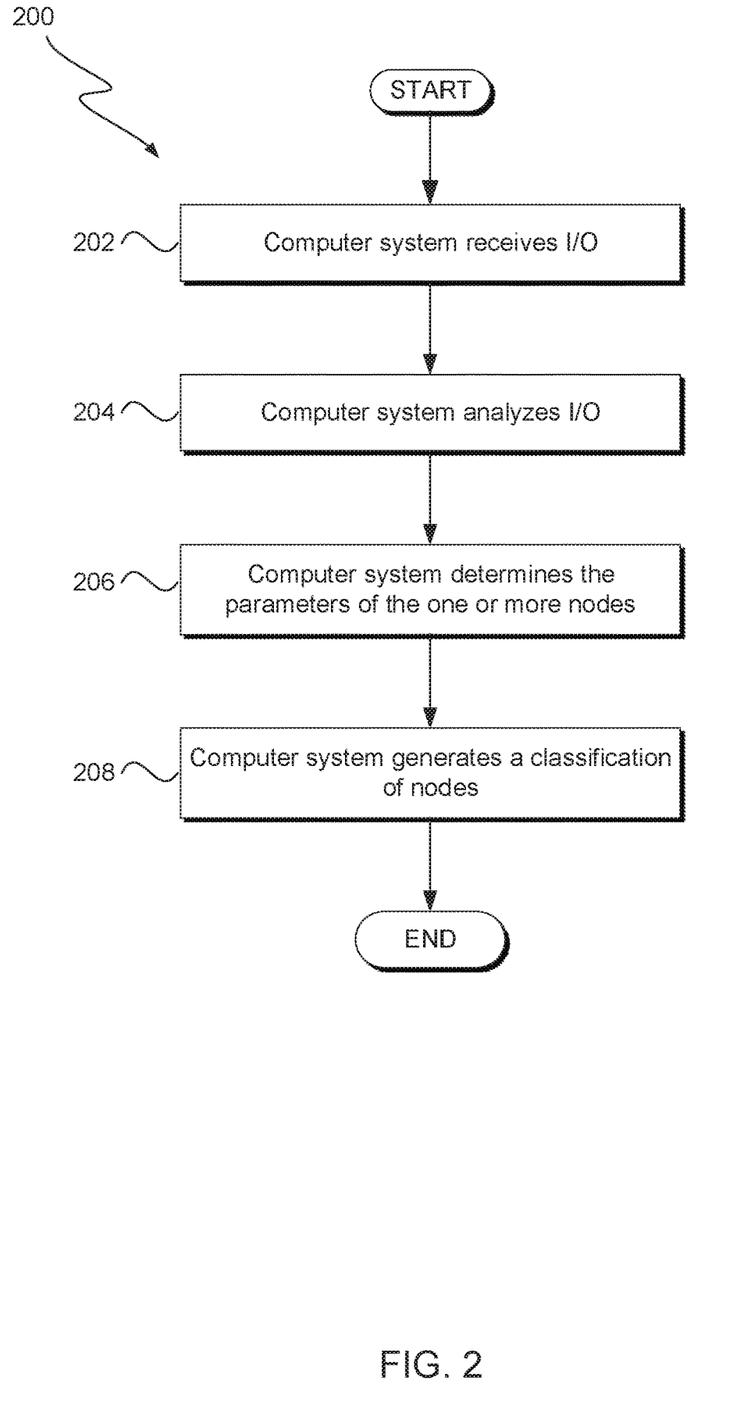
FIG. 2 illustrates operational processes of a mixing pattern analysis is generated, on a computing device within the environment of FIG. 1, in accordance with an exemplary embodiment of the present invention.

FIG. 2 is a flowchart depicting operations for executing a mixing pattern analysis system for computing environment 100, in accordance with an illustrative embodiment of the present invention. More specifically, FIG. 2, depicts combined overall operations 200, mixer analyzation program 122 executing on computer system 120. In some embodiments operations 200 represents logical operations of mixer analyzation program 122, wherein mixer analyzation program 122 represents interactions between logical units executing on computer system 120. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiments, the series of operations, of flowchart 200, can be performed simultaneously. Additionally, the series of operations, in flowchart 200, can be terminated at any operation. In addition to the features previously mentioned, any operations, of flowchart 200, can be resumed at any time.

In operation 202, mixer analyzation program 122 communicates a homophily request to server program 142 and requests party-mixing data. In some embodiments, server program 142 retrieves party-mixing data from database 144 and communicates the party-mixing data to mixer analyzation program 122 based, at least in part, on the homophily request. In an alternative embodiment, based, at least in part, on the homophily request, server program 142 communicates with server system 130 and retrieves party mixing data and server program 142 communicates the party-mixing data to mixer analyzation program 122.

In operation 204, mixer analyzation program 122 analyzes the party-mixing data and identifies (i) one or more nodes and (ii) one or more transactions associated with each independent node, respectively. In various embodiments, mixer analyzation program 122 further analyzes the attributes of the one or more nodes contained within party-mixing data in view of the homophily request generated by a user of computer system 120. In some embodiments, mixer analyzation program 122 analyzes the one or more transactions, associated with each independent node, and identifies which nodes transact with the various other nodes within server system 130.

In some embodiments of the present invention, mixer analyzation program 122 analyzes one or more nodes within the party-mixing data and further analyzes the one or more attributes of the one or more nodes. Mixer analyzation program 122 identifies the attributes of the one or more nodes that include but are not limited to, account creation date, account type, account number, the identity of the organization, organization function, owner of the account, age of owner, etc., of the one or more nodes, respectively. Mixer analyzation program 122 stores this information on database 144.

In some embodiments, mixer analyzation program 122 analyzes the one or more transactions of the one or more nodes and identifies the various nodes that are transacting with the one or more nodes. In some embodiments, mixer analyzation program 122 analyzes one or more nodes based, at least, on the homophily request and identifies various nodes that are distinct from the one or more nodes that are transacting with the one or more nodes. In one example and embodiment, mixer analyzation program 122 analyzes five nodes and the various transactions among the five nodes. Mixer analyzation program 122 identifies one or more transactions of the five nodes. In some embodiments, mixer analyzation program 122 identifies one or more transactions between the five nodes. In another embodiment, mixer analyzation program 122 identifies that the first node within the five nodes, receives transactions from a node distinct from the five nodes. Mixer analyzation program 122 identifies this transaction and stores the information on database 144. In an alternative embodiment, mixer analyzation program 122 identifies that the first node within the five nodes, receives transactions from a node distinct from the five nodes. In this alternative embodiment, mixer analyzation program 122 analyzes the transactions and the distinct node and identifies that the owner of the first node and the distinct node are the same. Mixer analyzation program 122 stores this information on database 144.

In operation 206, mixer analyzation program 122 based, at least in part, on the homophily request, determines the parameters of the one or more nodes. In various embodiments, mixer analyzation program 122 analyzes the homophily request and identifies the "n" properties and "k" categories the user of computer system 120 selected to classify the parameters of the nodes. Mixer analyzation program 122 analyzes the attributes of the one or more nodes and determines the parameters of the one or more nodes based, at least in part, on the "n" properties and "k" categories selected by the user of computer system 120 of the homophily request.

In some embodiments, mixer analyzation program 122 analyzes the homophily request and identifies the properties and categories for each parameter for the nodes. Mixer analyzation program 122 based, at least in part, on the threshold level of properties and categories determines the parameters of the one or more nodes. In various embodiments, mixer analyzation program 122 determines the parameters for one or more nodes, and further, mixer analyzation program 122 determines the measure of (i) partyness and (ii) counter-partyness of the one or more nodes. In various embodiments, mixer analyzation program 122 identifies the threshold level for the parameters of the one or more nodes that include, but are not limited to, (i) low, (ii) medium, or (iii) high. Mixer analyzation program 122 based, at least in part, on the threshold level identified in the homophily request, determines the parameters of the one or more nodes.

In operation 208, mixer analyzation program 122 classifies the one or more nodes and generates a homophily hierarchy based, at least in part, on the classification of the one or more nodes. In various embodiments, the homophily hierarchy contains one or more classes that each include, at least, one or more nodes, respectively. Mixer analyzation program 122 identifies the threshold level parameters of the one or more nodes and classifies the nodes, as discussed above, accordingly. Mixer analyzation program 122 stores the homophily hierarchy on database 144.

Figure 3:
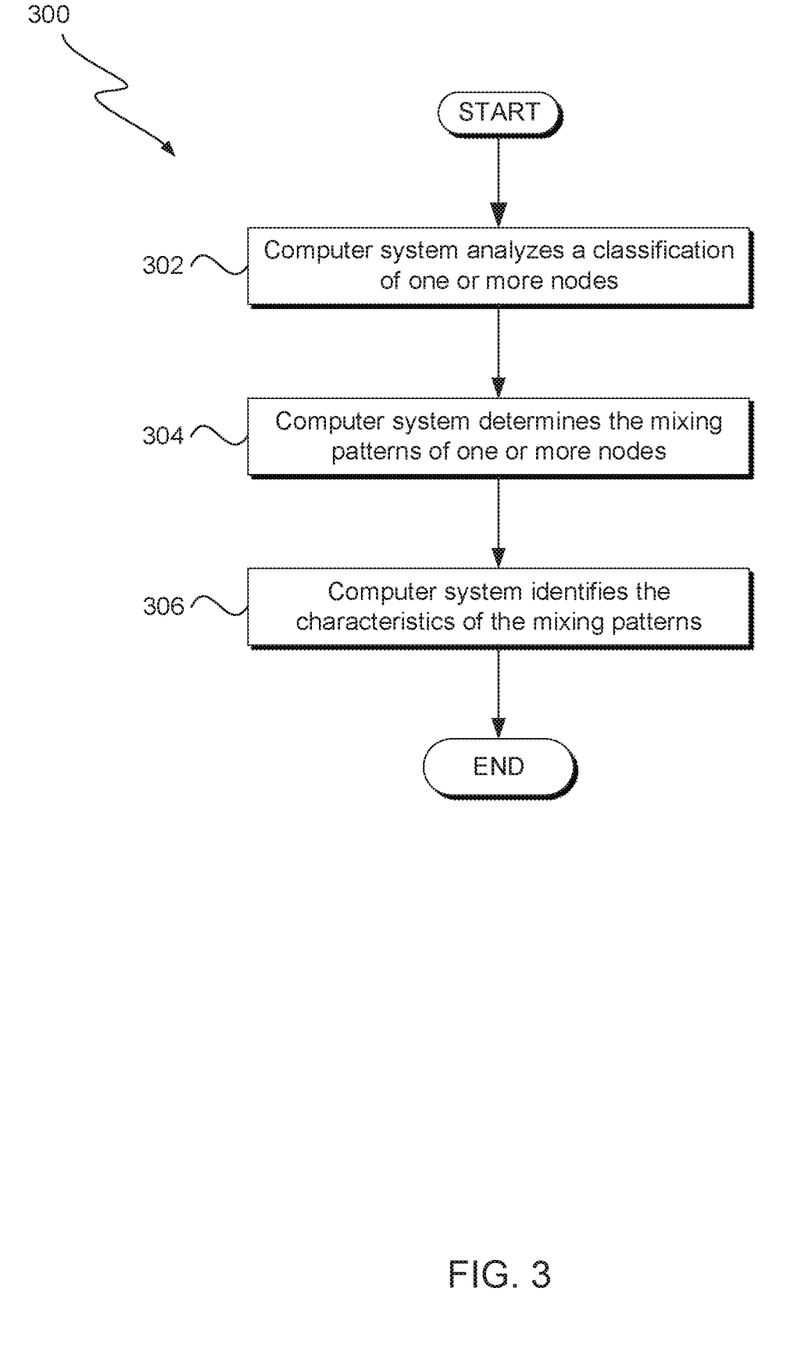
FIG. 3 illustrates operational processes of mixing pattern analysis is analyzed, on a computing device within the environment of FIG. 1, in accordance with an exemplary embodiment of the present invention.

FIG. 3 depicts a flowchart depicting operations for a mixing pattern analysis system for computing environment 100, in accordance with an illustrative embodiment of the present invention. More specifically, FIG. 3, depicts combined overall operations, 300, of mixer analyzation program 122 executing on computer system 120. In some embodiments, operations 300 represents logical operations of mixer analyzation program 122, wherein server program 142 represents interactions between logical units executing on computer system 120. Further, operations 300 can include a portion or all of combined overall operations of 200. It should be appreciated that FIG. 3 provides an illustration of one implementation and does not imply any limitations with regard to the environments in which different embodiments may be implemented. Many modifications to the depicted environment may be made. In one embodiment of flowchart 300, the series of operations can be performed in any order. In another embodiment, the series of operations, of flowchart 300, can be performed simultaneously. Additionally, the series of operations, in flowchart 300, can be terminated at any operation. In addition to the features previously mentioned, any operations, of flowchart 300, can be resumed at any time.

In operation 302, mixer analyzation program 122 analyzes the homophily hierarchy, and more specifically, analyzes each node within the homophily hierarchy, respectively. In various embodiments, mixer analyzation program 122 analyzes the one or more nodes of the homophily hierarchy and identifies the classification of the one or more nodes. In some embodiments, the one or more nodes are classified as one of: (i) partyness or (ii) counter-partyness and include a specified threshold level based, at least in part, on the homophily request. The threshold level includes, but is not limited to, (i) low, (ii) medium, or (iii) high.

In various embodiments of the present invention, mixer analyzation program 122 analyzes the one or more nodes and identifies the various classifications of the one or more nodes. Mixer analyzation program 122 further identifies various nodes that transact with the one or more nodes within the homophily hierarchy. Based, at least in part, on the identification of the various nodes transacting with the one or more nodes, mixer analyzation program 122 identifies the (i) partyness or (ii) counter-partyness threshold level of transacting with the one or more nodes. In some embodiments, mixer analyzation program 122 stores this information on database 144. In another embodiment, mixer analyzation program 122 populates computer interface 124 with this information.

In operation 304, mixer analyzation program 122 determines based, at least, on the analyzation of the classification of the one or more nodes of the homophily hierarchy, determines the mixing patterns of the one or more nodes. In various embodiments of the present invention, mixer analyzation program 122 determines the mixing pattern of each independent node to be one of: (i) assortativity, (ii) disassortavity, (iii) counter-assortativity, or (iv) counter-disassortativity, respectively. Mixer analyzation program 122 generates a mixing pattern label and assigns the respective mixing pattern label to each independent node.

In one embodiment and example of the present invention, mixer analyzation program 122 determines that node A is counter-assortative. In some embodiments, mixer analyzation program 122 analyzed the transactions that occur with node A and identified that one or more nodes within the class of node A transact frequently with node A, while node A does not transact out to one or more nodes. Additionally, mixer analyzation program 122 determines that node A has a threshold level of low partyness and high counter-partyness, and mixer analyzation program 122 determines that one or more nodes are likely to transact to node A, while node A does not transact out to one or more identified nodes. Based, at least in part, on the analyzation by mixer analyzation program 122, mixer analyzation program 122 determines that the mixing pattern of node A is counter-assortative.

In one embodiment and example of the present invention, mixer analyzation program 122 determines that node A is counter-disassortative. In some embodiments, mixer analyzation program 122 analyzed the transactions that occur with node A and identified that one or more nodes other than the class associated, at least, with node A transact frequently with node A, while node A does not transact out to one or more identified nodes. Additionally, mixer analyzation program 122 determines that node A has a threshold level of low partyness and high counter-partyness, and mixer analyzation program 122 determines that one or more nodes are likely to transact to node A, while node A does not transact out to one or more nodes. Based, at least in part, on the analyzation by mixer analyzation program 122, mixer analyzation program 122 determines that the mixing pattern of node A is counter-disassortative.

In various embodiments of the present invention, mixer analyzation program 122 analyzes the transactions of one or more nodes identified in the homophily hierarchy and identifies the various transactions that occur with one or more nodes. Additionally, mixer analyzation program 122 identifies the classification of the one or more nodes that includes, but is not limited to: (i) partyness, (ii) counter-partyness, (iii) account owner, (iv) length of time the account has been established, etc. In various embodiments, as discussed above, mixer analyzation program 122 analyzes the classifications and transactions of the one or more nodes and identifies the mixing patterns of the one or more nodes that include, but are not limited to, (i) assortative, (ii) disassortative, (iii) counter-assortative, or (iv) counter-disassortative, respectively.

In operation 306, mixer analyzation program 122 analyzes the mixing patterns of the one or more nodes and identifies the characteristics of the mixing patterns for the one or more nodes. In various embodiments, mixer analyzation program 122 analyzes node A which has a counter-assortative mixing pattern and mixer analyzation program 122 identifies that node A receives transactions from one or more nodes of the same class, while node A does not transact out to various other nodes. Based, at least in part, on this identification, mixer analyzation program 122 determines that node A is likely to only receive transactions from various nodes in the same class as node A in subsequent transactions.

In various embodiments, mixer analyzation program 122 analyzes node B which has a counter-disassortative mixing pattern and mixer analyzation program 122 identifies that node B receives transactions from one or more nodes not of the same class as node B, while node B does not transact out to various other nodes. Based, at least in part, on this identification, mixer analyzation program 122 determines that node B is likely to only receive transactions from various nodes outside of the class of node B in subsequent transactions.

In various embodiments, mixer analyzation program 122 populates computer interface 124 with the mixing pattern data and the characteristics of the one or more nodes of the homophily hierarchy. In some embodiments, mixer analyzation program 122 stores this information on database 144.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
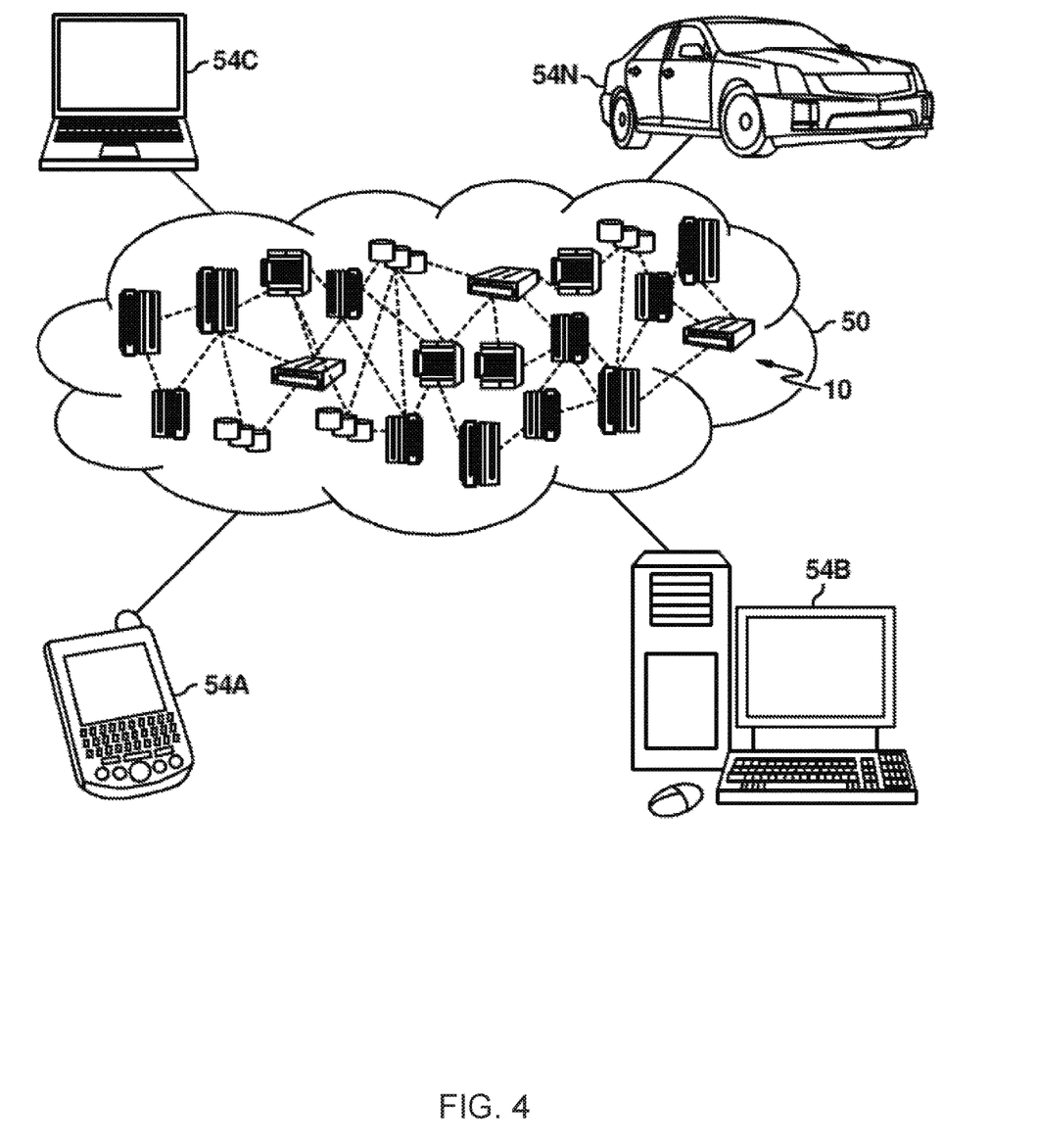
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
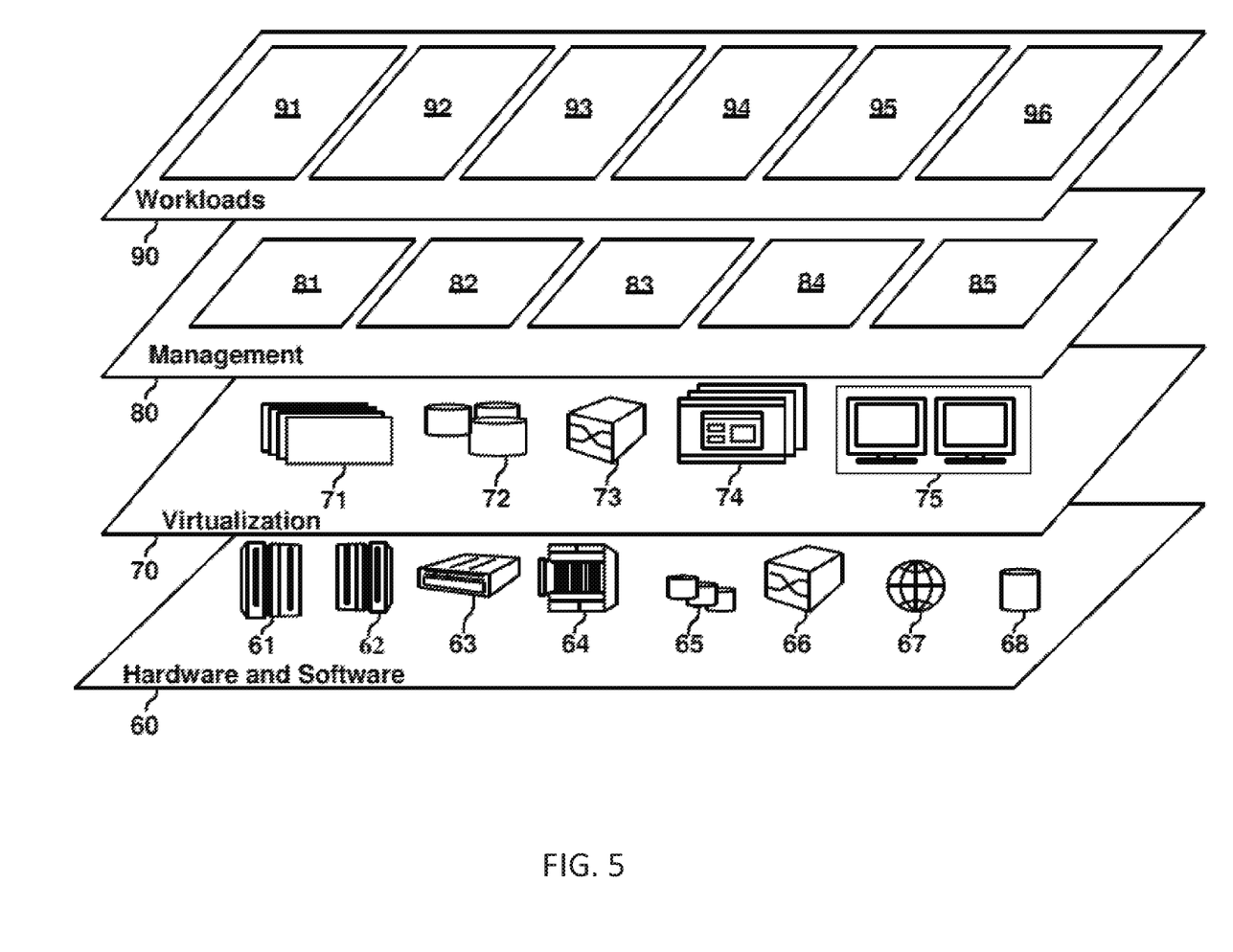
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
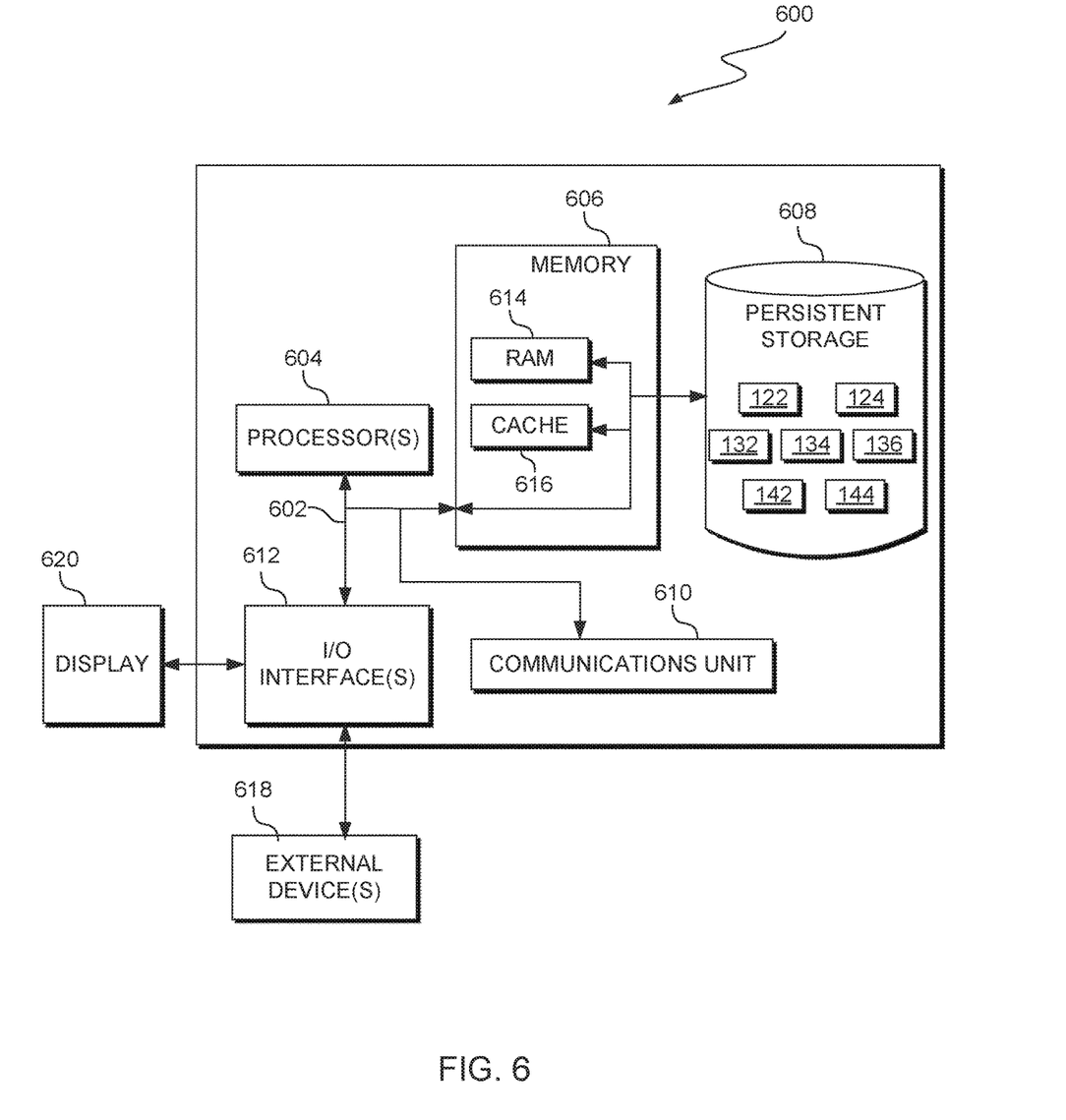
FIG. 6 depicts a block diagram of components of one or more computing devices within the computing environment depicted in FIG. 1, in accordance with an exemplary embodiment of the present invention.

FIG. 6 depicts a block diagram, 600, of components of computer system 120, server system 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, server system 130, and SAN 140 includes communications fabric 602, which provides communications between computer processor(s) 604, memory 606, persistent storage 608, communications unit 610, and input/output (I/O) interface(s) X12. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Mixer analyzation program 122, computer interface 124, institution 132, institution 134, institution 136, server program 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Mixer analyzation program 122, computer interface 124, institution 132, institution 134, institution 136, server program 142, and database 144 may be downloaded to persistent storage 608 through communications unit 610.

I/O interface(s) 612 allows for input and output of data with other devices that may be connected to computer system 120, server system 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., mixer analyzation program 122, computer interface 124, institution 132, institution 134, institution 136, server program 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
   receiving, by one or more processors, a request to identify party-mixing transactions between nodes of a plurality of nodes in a network, the nodes of the plurality of nodes corresponding to respective parties of a plurality of parties;
   analyzing, by one or more processors, transactions between the nodes of the plurality of nodes, the transactions between the nodes corresponding to respective transactions between the respective parties of the plurality of parties;
   grouping, by one or more processors, the nodes of the plurality of nodes into classes based, at least in part, on the transactions between the nodes; and
   determining, by one or more processors, mixing patterns associated with the transactions between the nodes,
   wherein the mixing patterns include: (i) a first mixing pattern indicating a tendency of a first node in a first class to receive transactions from the nodes in one or more classes other than the first class that are dissociated with the first class, and (ii) a second mixing pattern indicating a tendency of a second node in a second class to send transactions to the nodes in one or more classes other than the second class that are disassociated with the second class.

2. The computer-implemented method of claim 1, the method further comprising:
   generating, by one or more processors, in response to the request, a homophily hierarchy that illustrates transactions between the nodes of the plurality of nodes based, at least in part, on the determined mixing patterns.

3. The computer-implemented method of claim 2, the method further comprising:
   communicating, by one or more processors, the homophily hierarchy to a set of users associated with the request.

4. The computer-implemented method of claim 1, the method further comprising:
   instructing, by one or more processors, an administrator of the network to transmit the party-mixing transactions based, at least in part, on the request; and
   receiving, by one or more processors, the party-mixing transactions from the administrator of the network.

5. The computer-implemented method of claim 1, wherein the classes include a first class having one or more nodes with a tendency to be a source of transactions and a second class having one or more nodes with a tendency to be a recipient of transactions.

6. The computer-implemented method of claim 1, wherein the nodes of the plurality of nodes include respective attributes, the attributes including account creation date, account type, account number, and identity of account owner.

7. The computer-implemented method of claim 1, the method further comprising:
   determining, by the one or more processors, additional mixing patterns associated with the transactions between the nodes,
   wherein the additional mixing patterns include: (i) a third mixing pattern indicating a tendency of a third node in a third class to send transactions to nodes in one or more classes that are associated with the third class and (ii) a fourth mixing pattern indicating a tendency of a fourth node in a fourth class to receive transactions from nodes in one or more classes that are associated with the fourth class.

8. A computer program product, the computer program product comprising:
   one or more computer-readable storage media and program instructions stored on the one or more computer-readable storage media, the stored program instructions comprising:
   program instructions to receive a request to identify party-mixing transactions between nodes of a plurality of nodes in a network, the nodes of the plurality of nodes corresponding to respective parties of a plurality of parties;
   program instructions to analyze transactions between the nodes of the plurality of nodes, the transactions between the nodes corresponding to respective transactions between the respective parties of the plurality of parties;
   program instructions to group the nodes of the plurality of nodes into classes based, at least in part, on the transactions between the nodes; and
   program instructions to determine mixing patterns associated with the transactions between the,
   wherein the mixing patterns include: (i) a first mixing pattern indicating a tendency of a first node in a first class to receive transactions from the nodes in one or more classes other than the first class that are dissociated with the first class, and (ii) a second mixing pattern indicating a tendency of a second node in a second class to send transactions to the nodes in one or more classes other than the second class that are disassociated with the second class.

9. The computer program product of claim 8, the stored program instructions further comprising:
   program instructions to generate, in response to the request, a homophily hierarchy that illustrates transactions between the nodes of the plurality of nodes based, at least in part, on the determined mixing patterns.

10. The computer program product of claim 9, the stored program instructions further comprising:
    program instructions to communicate the homophily hierarchy to a set of users associated with the request.

11. The computer program product of claim 8, the stored program instructions further comprising:
    program instructions to instruct an administrator of the network to transmit the party-mixing transactions based, at least in part, on the request; and
    program instructions to receive the party-mixing transactions from the administrator of the network.

12. The computer program product of claim 8, wherein the classes include a first class having one or more nodes with a tendency to be a source of transactions and a second class having one or more nodes with a tendency to be a recipient of transactions.

13. The computer program product of claim 8, wherein the nodes of the plurality of nodes include respective attributes, the attributes including account creation date, account type, account number, and identity of account owner.

14. The computer program product of claim 8, the stored program instruction further comprising:
   program instructions to determine additional mixing patterns associated with the transactions between the nodes,
   wherein the additional mixing patterns include: (i) a third mixing pattern indicating a tendency of a third node in a third class to send transactions to nodes in one or more classes that are associated with the third class and (ii) a fourth mixing pattern indicating a tendency of a fourth node in a fourth class to receive transactions from nodes in one or more classes that are associated with the fourth class.

15. A computer system, the computer system comprising:
   one or more computer processors;
   one or more computer readable storage medium; and
   program instructions stored on the one or more computer readable storage medium for execution by at least one of the one or more processors, the stored program instructions comprising:
   program instructions to receive a request to identify party-mixing transactions between nodes of a plurality of nodes in a network, the nodes of the plurality of nodes corresponding to respective parties of a plurality of parties;
   program instructions to analyze transactions between the nodes of the plurality of nodes, the transactions between the nodes corresponding to respective transactions between the respective parties of the plurality of parties;
   program instructions to group the nodes of the plurality of nodes into classes based, at least in part, on the transactions between the nodes; and
   program instructions to determine mixing patterns associated with the transactions between the nodes,
   wherein the mixing patterns include: (i) a first mixing pattern indicating a tendency of a first node in a first class to receive transactions from the nodes in one or more classes other than the first class that are dissociated with the first class, and (ii) a second mixing pattern indicating a tendency of a second node in a second class to send transactions to the nodes in one or more classes other than the second class that are disassociated with the second class.

16. The computer system of claim 15, the stored program instructions further comprising:
   program instructions to generate in response to the request, a homophily hierarchy that illustrates transactions between the nodes of the plurality of nodes based, at least in part, on the determined mixing patterns.

17. The computer system of claim 16, the stored program instructions further comprising:
   program instructions to communicate the homophily hierarchy to a set of users associated with the request.

18. The computer system of claim 15, the stored program instructions further comprising:
   program instructions to instruct an administrator of the network to transmit the party-mixing transactions based, at least in part, on the request; and
   program instructions to receive the party-mixing transactions from the administrator of the network.

19. The computer system of claim 15, wherein the classes include a first class having one or more nodes with a tendency to be a source of transactions and a second class having one or more nodes with a tendency to be a recipient of transactions.

20. The computer system of claim 15, the stored program instructions further comprising:
   program instructions to determine additional mixing patterns associated with the transactions between the nodes,
   wherein the additional mixing patterns include: (i) a third mixing pattern indicating a tendency of a third node in a third class to send transactions to nodes in one or more classes that are associated with the third class and (ii) a fourth mixing pattern indicating a tendency of a fourth node in a fourth class to receive transactions from nodes in one or more classes that are associated with the fourth class.

* * * * *